United States Patent [19]
Heaps et al.

[11] 4,128,689
[45] Dec. 5, 1978

[54] THERMOPLASTIC POLYMER SHEETS OR WEB MATERIAL USEFUL AS SURFACING MATERIALS AND THEIR MANUFACTURE

[75] Inventors: John M. Heaps, Bourne End; Chisen Lu, Hounslow, both of England

[73] Assignee: Formica International Limited, London, England

[21] Appl. No.: 790,990

[22] Filed: Apr. 26, 1977

[30] Foreign Application Priority Data

Apr. 27, 1976 [GB] United Kingdom ............... 17005/76

[51] Int. Cl.$^2$ ............................................. B29D 27/00
[52] U.S. Cl. ................................ 428/311; 156/244.24; 521/59; 264/51; 264/75; 264/129; 264/162; 264/211; 264/321; 264/DIG. 8; 428/106; 428/151; 428/315; 428/910
[58] Field of Search ................... 264/53, DIG. 8, 51, 264/75, 76, 129, 162, 211, 321; 260/2.5 B; 428/311, 106, 151, 315, 910; 156/244.24

[56] References Cited
U.S. PATENT DOCUMENTS

| | | | |
|---|---|---|---|
| 3,384,531 | 5/1968 | Parrish | 264/53 X |
| 3,755,520 | 8/1973 | Cogliano | 264/53 |
| 3,856,719 | 12/1974 | Miyamoto et al. | 264/53 X |
| 3,931,380 | 1/1976 | Belivakici et al. | 264/53 X |
| 3,932,569 | 1/1976 | Fuss | 264/53 X |

FOREIGN PATENT DOCUMENTS

1098770 1/1968 United Kingdom ............. 264/DIG. 8

Primary Examiner—Philip Anderson
Attorney, Agent, or Firm—Murray & Whisenhunt

[57] ABSTRACT

The invention relates to a process for preparing thermoplastic sheets or webs suitable for use as surfacing materials.

Sheets of thermoplastic polymers are known as surfacing materials and, when foamed, as substitutes for wood, but available materials do not closely resemble natural wood in appearance. The present invention provides a process whereby sheets or webs are obtained which can provide a wide variety of decorative finishes and which can approximate the appearance of such natural products as wood and marble.

The process of the invention comprises the extrusion of a foamable mixture of immiscible thermoplastic polymers, one of which is crystalline and of higher melting point than another, stretching the resulting foamed extrudate, compressing the stretched extrudate and then cooling the stretched and compressed extrudate. The resulting product is substantially impermeable and has integral patterning and can be used as a surfacing material in a variety of applications.

14 Claims, 1 Drawing Figure

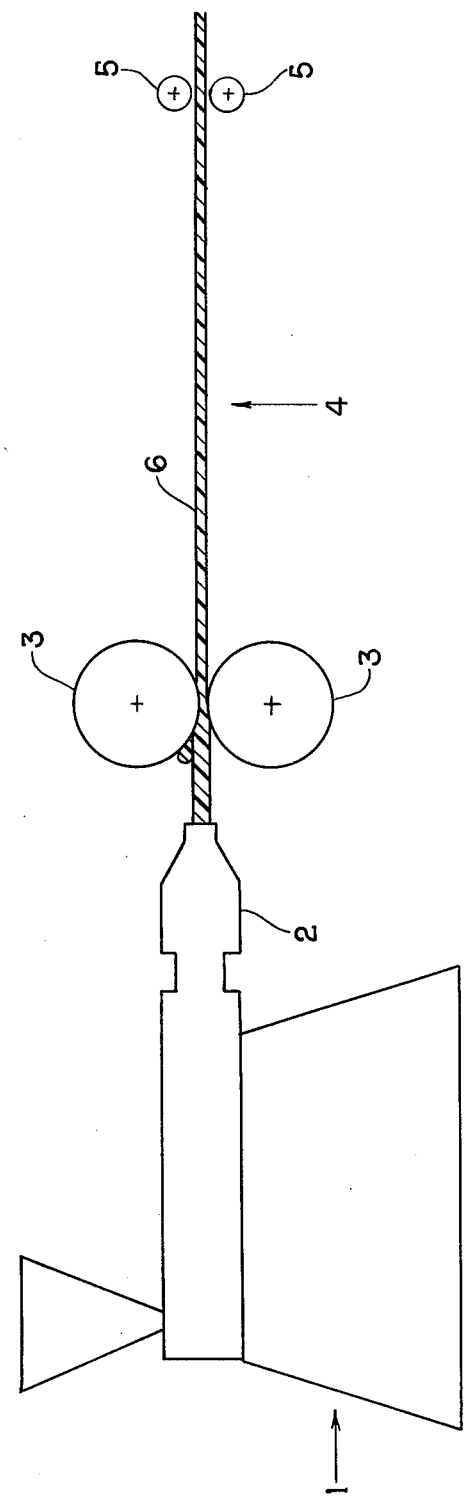
FIGURE

THERMOPLASTIC POLYMER SHEETS OR WEB MATERIAL USEFUL AS SURFACING MATERIALS AND THEIR MANUFACTURE

This invention relates to a process for preparing thermoplastic sheets or webs and to the products produced thereby, the said products being useful as surfacing materials.

Plastics sheets comprising thermoplastic polymers are well known as surfacing materials and include, for example, polyvinyl chloride sheets exhibiting decorative effects recognisable as imitations of natural wood and foamed thermoplastic polymers for use as wood substitutes. However, none of the known thermoplastic polymer based materials closely approaches, in appearance or surface texture, natural wood which has a characteristic cellular and fibrous structure and integral, differently coloured, areas.

The present invention provides a process for preparing thermoplastic sheets or webs, which process comprises the steps of:

(i) extruding a foamable mixture through the die of a screw extruder to produce a foamed extrudate in sheet or web form, the foamable mixture containing at least a first and a second thermoplastic polymer, the first thermoplastic polymer being substantially crystalline and having a higher melting point (as hereinafter defined) than, and being substantially immiscible with, the second thermoplastic polymer, and the temperature of extrusion being equal to or greater than the melting point of the first thermoplastic polymer;

(ii) stretching the foamed extrudate from step (i) in the direction of extrusion as it leaves the die;

(iii) compressing the stretched extrudate from step (ii) while it remains plastic; and (iv) cooling the foamed, stretched and compressed extrudate from step (iii).

We have found that by suitable selection of the ingredients of the foamable mixture of thermoplastic polymers, by the use of suitable dyes and pigments, and by the selection of appropriate extrusion, drawing and compression conditions we can provide thermoplastic sheets or webs which have a structure, appearance and texture unlike those known hitherto and which can approximate in appearance and texture to wood veneers or other natural products having pattern striations. Thus, by the process of the invention we provide substantially impermeable thermoplastic sheets or webs with integral patterning. This integral patterning is created by differences in texture or reflectivity between adjacent areas of the sheet or web arising from the presence therein of immiscible thermoplastic polymers and can be enhanced by colouring the adjacent areas differently. The first and second polymers (which may be differently coloured) do not form an homogeneous mixture during the process and hence may be distinguished from each other in the resulting product. Because of their different physical properties and optionally different colours, the different polymers together confer upon the product a decorative effect, which effect may be utilised by selection of appropriate ingredients and processing conditions to provide products which closely simulate natural wood, or marble or other natural materials.

Where herein we use the term "melting point" in relation to a crystalline polymer, we mean that temperature at which the polymer changes state from a solid to a liquid and where we use the term in relation to a non-crystalline polymer we mean that temperature commonly referred to as the glass transition temperature.

Whilst it is within the scope of our invention to employ substantially crystalline polymers as both the first and second thermoplastic polymers, we prefer to employ foamable mixtures comprising a non-crystalline polymer as the second thermoplastic polymer.

For the sake of simplicity, our invention will hereinafter be described by reference to sheets or webs comprising two only thermoplastic polymers, namely the first substantially crystalline thermoplastic polymer of higher melting point than the second, preferably non-crystalline, thermoplastic polymer. It should be understood, however, that similar considerations to those discussed apply also to sheets and webs comprising three or more thermoplastic polymers where the context so allows, and that the preparation of such products is within the scope of our invention.

In performing the process of our invention, we prefer to form a foamable mixture of the first and second thermoplastic polymers and any other ingredients such as fire-retardants, stabilisers, fillers, anti-static agents and colourants prior to the introduction of the mixture into the extruder. The ingredients of the foamable mixture thus used may be in any suitable physical form such as beads or granules. We prefer the thermoplatic constituents to be in granular form, especially where the product is desired to exhibit a striated appearance.

Any or all of the polymers in a foamable mixture may be pre-compounded with a suitable blowing agent or, in a less preferred embodiment, at least one suitable blowing agent may be mixed with first and second polymers before or after they are placed in the extruder. Gas under pressure may be injected into a mixture of the first and second thermoplastic polymers in the extruder to act as, or to supplement, a blowing agent. Further, those ancilliary materials known for use in the production of uniform extruded foams as "cell size control additives" may be incorporated into the mixture prior to extrusion.

We prefer, however, to utilise mixtures wherein at least one of the first and second thermoplastic polymers incorporates a blowing agent and, more especially, to employ as the second thermoplastic polymer a non-crystalline polymer incorporating a blowing agent together with a substantially crystalline first thermoplastic polymer which does not incorporate such an agent; optionally also, further non-crystalline polymers not incorporating a blowing agent may be included.

Any suitable blowing agent may be used provided it produces a foamed extrudate at the temperature of the extrusion step (i). The blowing agent may thus be a compound which decomposes to provide gaseous or volatile decomposition products at the temperature of extrusion, or may be a compound which vaporises at the temperature of extrusion, or may be as mentioned above, a gas introduced under pressure into a mixture of first and second thermoplastic polymers in the extruder. Blowing agents for use in preparing foamed thermoplastic polymers are well known and any suitable known agent can be used. The blowing agent should be present in sufficient amount as to ensure satisfactory foaming. We have found that foamable mixtures incorporating up to about 5% by weight of blowing agent may be satisfactorily employed, but we prefer to use amounts up to about 1% by weight and still more preferably up to about 0.5% by weight of the blowing agent, the amount of blowing agent being based on the weight of the foamable mixture.

Suitable first and second thermoplastic polymers are known. Non-crystalline polymers which can be used as the second thermoplastic polymer include cellulose acetate, cellulose propionate, cellulose acetate butyrate, ethyl cellulose, polystyrene, styrene-acrylonitrile copolymers, polycarbonates, styrene and methyl styrene copolymers and phenylene oxide polymers. Substantially crystalline polymers which can be used as the first, and optionally also as the second, thermoplastic polymer include high density polyethylene, polypropylene, polybutene-1, poly 4-methyl pentene-1, polyethylene terephthalate and nylon 6 (polycaprolactam), nylon 66 (poly(hexamethyleneadipamide)) and nylon 11 (polyundecanoamide).

We prefer to employ polystyrene and polypropylene mixtures; more preferably we employ a major proportion of polystyrene and a minor proportion of polypropylene. Still more preferably we employ 60 to 95 parts of polystyrene and 40 to 5 parts of polypropylene per 100 parts by weight of the thermoplastic components of the mixture. In the most preferred embodiment, we employ both the polystyrene and polypropylene in granular form with only the polystyrene granules incorporating a blowing agent.

As is well known, thermoplastic polymer materials are available commercially in coloured and uncoloured varieties and we select the colour or colours of our material in accordance with the visual effect we desire in our product. Thus if we wish to provide a thermoplastic polymer sheet or web exhibiting a single colour, the colourants employed may be mixed with the polymers prior to extrusion. If we wish to provide a product with a variegated colour appearance, then we employ a colourant or colourants pre-incorporated into one or more of the polymeric components. More especially, if a striated colour effect similar to that observed in natural wood is desired, we prefer to employ granules of the second thermoplastic polymer comprising a colourant corresponding to the desired background colour with some, at least, of the granules of the first thermoplastic polymer comprising a relatively high proportion of the same or a different colourant, optionally with granules of at least one other high melting point polymer containing a relatively lower proportion of the same or a different colourant.

When employed, the size and number of the polymer granules comprising a high proportion of colourant determines, at least in part, the decorative effect of the products sheets or webs. By the operation of our process, streaks and lines, corresponding generally with the number and size of the highly pigmented particles, are created in the product; smaller granules give generally narrower streaks than the larger granules and hence products having a desired striated appearance can be produced by suitable selections of the size and number of highly coloured granules incorporated in the foamable mixture.

The following description of the performance of our invention will be made with reference to the accompanying FIGURE.

The FIGURE is a schematic representation of an extrusion apparatus suitable for carrying out the process of our invention.

The FIGURE shows an extruder 1 which may be, for example, a conventional single screw extruder having an L:D (length to diameter) of about 20:1 and a compression ratio of about 2:1. The extruder is fitted with a controllable heating means and a suitably dimensioned die 2. The die 2 is preferably a conventional "coat hanger" sheet die fitted with a restrictor bar and adjustable die lips (by means of which a generally cylindrical feed from the extruder barrel is caused to flatten and form a substantially planar web or ribbon of extrudate). The die size is determined in accordance with the desired dimensions of the product.

By suitable operation of the extruder 1 with regard to feed rate, screw speed and temperatures, the foamable mixture therein is heated and forced out through the die 2 as extrudate 6. The mixture in the extruder is heated so that its temperature in the barrel and die is equal to or greater than (but not significantly in excess of) the melting temperature of the first thermoplastic polymer. The temperature of the extrudate 6 leaving the die 2 is preferably such that, in conjunction with the stretching action to which it is then subjected, most of the cells of the foam burst allowing escape of the gas or vapour produced by the blowing agent.

Because of the extensive collapse of the foam structure, the density of the product is considerably greater than that of conventional foamed extrudates and approaches that of unfoamed thermoplastic polymers.

The stretching and compression of the extruded foamed or foaming web emerging from the die is performed by suitable nip means which, by friction contact with the major surfaces of the web, draw it away from the die slit. We prefer the suitable nip means to comprise a pair of driven metal rollers 3 mounted on horizontal axes and vertically disposed in relation to each other so as to define a gap parallel to the die slit and so driven in contra-rotation at a selected speed that the frictional force exerted by them on the extrudate causes the desired stretching. The preferred rollers are provided with suitable cooling means whereby they may be maintained at a desired temperature and are mounted so as to be adjustable to provide between them the said gap which, being less than the thickness of the foamed extrudate approaching the rollers, acts as a nip with the result that the extrudate is compressed as it passes through the gap.

By suitable operation and control of the extruder, the die lips and restrictor bar settings, the temperature of the extrudate, the nip roller drive speed and the nip roller spacings, the surface texture and appearance of the web leaving the stretching/compression means may be varied. As has been stated above, the effect of the stretching on the foamed extrudate in combination with its temperature is such that most of the foam cells are ruptured, allowing escape to the atmosphere of gas or vapour from the blowing agent; further, the walls of the collapsed cells become elongated in the direction of stretch and an orientation is imparted to the thermoplastic materials. As a consequence of the stretching, the web is caused to take up a fibrous structure which may be more or less marked as determined by the degree of stretch employed and, in a preferred embodiment, the process is performed and controlled so that the product web has a texture and appearance of natural wood.

The texture and appearance of the product web may also be varied in a controlled reproducible manner by forming and maintaining, by alterations in suitable variables in the machine and process, a surplus of the extrudate upon the web at the nip formed by the rollers. This surplus material forms a "rolling bank" at the inlet to the gap between the rollers and modifies the surface of the web with which it is in contact, the extent of the modification being determined in part by the size and shape of the rolling bank.

The extrudate leaving the die slit is at a temperature substantially the same as that maintained in the die; however, after emerging from the slit the temperature rapidly falls due to heat losses to the atmosphere and loss of blowing agent. The distance between the die slit and the nip means should be such that when the extrudate reaches the latter it is still in a plastic state and thus its surface can be modified and consolidation effected. We prefer that the spacing between the nip means and the die slit is variable so that the plastic consistency of the extrudate entering the nip is that which has been determined by previous trial to be the optimum. By adjustment of this spacing and the temperature of the rollers comprising the nip means, close control of the plasticity of the extrudate in the nip area can be maintained. Control of this plasticity is important in that it determines, at least in part, the texture and appearance of the product sheet or web; if the extrudate were to be too plastic, then the desired fibrous structure would be substantially lost whilst if the extrudate were to be insufficiently plastic, then the extrudate would recover substantially from the compression imparted by the nip rollers.

The web, after stretching and compression is further cooled, preferably under tension, suitably by passage through a cooling zone 4 which may be (but cooling means such as chilled rollers may optionally be used) and then either reeled, optionally, for later cutting into sheets of the desired dimensions, or cut into desired sheets without reeling. During this further cooling step, the web may be maintained under tension for example by suitable nip means such as a pair of haul-off rollers 5, as shown in the FIGURE.

The thermoplastic sheets or webs produced according to the process of the invention may be affixed to substrates using suitable known adhesives customarily employed for adhering thermoplastic materials to the desired substrates. For example, the sheets or webs may be adhered to chipboard substrates by urea-formaldehyde or polyvinyl acetate adhesives using conventional presses and operating temperatures.

The thermoplastic sheets or webs can be sanded (suitably after adhesion to the desired substrate) using conventional sanding techniques and apparatus. Further, the sheets or webs whether sanded or not can be stained, for example with conventional wood stains, and can be varnished with natural or synthetic resin varnishes to provide a desired surface finish.

The width of the sheets and webs that may be prepared according to the process of the invention is limited only by the dimensions of the die, nip means and ancilliary equipment available. The thickness of the sheets and webs may be varied over a wide range but we prefer to prepare products from 0.2 mm to 2.0 mm thick and, more preferably, 0.4 to 1.0 mm thick. The sheets and webs in the more preferred range are convenient to handle and apply and are economic to produce.

In order that the invention may be more clearly understood, it is further illustrated by the following Examples.

EXAMPLE 1

A thermoplastic sheet having an appearance and texture approximating to a natural wood was prepared as follows:

- 400 parts by weight of polystyrene granules (Sterling ST. 153) (Natural)
- 150 parts by weight of polypropylene granules (I.C.I. "Propathene" GWE.21) (Natural).
- 200 parts by weight of expandable polystyrene ("Styropor" P.455) (Natural). and
- 1 part by weight of polypropylene granules (Black Masterbatch I.C.I "Propathene" C4/905 Ebony Black).

("Styropor" and "Propathene" are Registered Trade Marks).

were mixed and charged to a 60 mm single screw extruder having a 22:1 L/D ratio and a 2:1 compression ratio screw operating at a screw speed of 40 r.p.m. The outlet part of the extruder was coupled directly to a slit die of "coathanger" construction fitted with a restrictor bar and adjustable die nips. The mouth of the slit was 500 mm wide and was set to a slit height of 2 mm.

The heaters on the extruder were set to produce temperatures in the four zones of the barrel of the extruder and in the die of 140°, 150°, 160°, 170° and 180° C. respectively.

On operation of the extruder, the mixture was forced through the slit and foaming of the extrudate occurred. The foamed extrudate was drawn away from the slit by nip means positioned 400 mm from the die slit and comprising a pair of 660 × 120 mm hard chrome plated metal rollers mounted on horizontal axes and provided with a cooling water circulation system. The rolls were hydraulically loaded to give a roll pressure of about 1360 kg. and were driven in contra-rotation to each other at the same surface speed of 10 ft/min (3.05 m/min).

The rolls were so positioned that their adjacent surfaces were 0.5 mm apart and were maintained at a temperature of 15° C. The speed of rotation of the rollers was such that by means of frictional contact the foamed extrudate was stretched, in the direction of extrusion, to produce an elongation of about 3 times. The stretching, together with the temperature and plasticity of the foam, was such that substantially all the foam bubbles burst and the thermoplastic components were oriented parallel to the stretch direction to give a fibrous structure prior to the extrudate entering the nip between the rollers.

The nip was so constructed and operated that a surplus of the extrudate in the form of a rolling bank (a cylinder of material extending the width of the web and of approximately 15 mm diameter) was built up and maintained upon the upper surface of the extrudate adjacent to the upper roller.

The stretched and correspondingly narrowed extrudate was compressed by passage through the nip to form a web having a width of the same order as the width of the die slit (500 mm), and then cooled by traversing a space of 800 mm to a haul-off unit comprising a pair of "Neoprene" ("Neoprene" is a Registered Trade Mark) coated rolls having the same dimensions as the stretch rolls and driven at the same speed so that the extrudate entering the nip between the haul-off rolls was held under slight tension. The material, which was about 1 mm thick, emerging from the nip between the haul-off rolls was then reeled.

Sheets of the desired size were cut from the reel and exhibited a silver lustre with integral black striations which together with its fibrillar structure closely approximated in texture to a wood veneer.

EXAMPLE 2

400 parts by weight polystyrene granules (Sterling ST. 153 Natural).

150 parts by weight polypropylene granules (I.C.I. "Propathene" GWE.21 Natural).

200 parts by weight expandable Polystyrene + brown pigmentation (Sterling EX. 4791. Y)

0.8 parts by weight Black Masterbatch ("Propathene" C4/905 Ebony Black)

2.0 parts by weight Red Masterbatch ("Propathene" C4/401 Guardsman Red)

20 parts by weight Yellow Masterbatch ("Propathene" C4/201 Crocus Yellow)

were mixed by tumble blending and processed as described in Example 1, except that the die was maintained at a temperature of 170° C., and the separation of the nip rollers was such as to maintain a rolling bank about 2 mm in diameter.

The web obtained (which was about 0.6 mm thick) had a matt surface patterned with fissures and coloured striations which together gave the web the appearance and feel of an open grained wood veneer. Sheets were cut from the web and adhered to a chipboard substrate by means of a conventional polyvinyl acetate adhesive.

EXAMPLE 3

400 parts by weight Polystyrene granules (Sterling ST.153 Natural)

150 parts by weight Polypropylene granules (I.C.I. "Propathene" GWE. 21 Natural)

200 parts by weight Expandable polystyrene + light brown pigmentation (Sterling EX. 4146.Y)

0.4 parts by weight Black Masterbatch ("Propathene" C4/905 Ebony Black)

0.5 parts by weight Red Masterbatch ("Propathene" C4/401 Guardsman Red)

40 parts by weight Yellow Masterbatch ("Propathene" C4/201 Crocus Yellow)

were mixed by tumble blending and processed as described in Example 1, except that the die temperature was maintained at 190° C. and the separation of the nip rollers was such as to maintain a rolling bank about 2 mm in diameter.

The web obtained (which was about 0.6 mm thick) had a smooth surface patterned with coloured striations which gave a good approximation to a polished wood veneer.

EXAMPLE 4

400 parts by weight Polystyrene granules (Sterling ST.153 Natural), 150 parts by weight Polypropylene granules (I.C.I. "Propathene" GWE.21)

200 parts by weight Expandable Polystyrene + dark brown pigmentation (Sterling EX. 4793)

2 parts by weight Black Masterbatch ("Propathene" C4/905 Ebony Black).

10 parts by weight Red Masterbatch ("Propathene" C4/401 Guardsman Red)

were mixed by tumble blending and processed as described in Example 1.

The web obtained had a rough surface texture and woodlike character combined with an attractive abstract patterning. The web was cut into sheets of desired size and then bonded to planks of chipboard using a conventional urea-based adhesive. After smoothing the sheet surface by passage through a mechanical sander, a finishing treatment with "button polish" was applied to provide the composite panel with a smooth polished wood-plank appearance.

EXAMPLE 5

60 parts by weight polycarbonate granules (Engineering Polymers Ltd, Lexan 2014 Natural)

10 parts by weight polypropylene granules (I.C.I. "Propathene" GWE 21 Natural)

0.4 parts by weight blowing agent (Fisons Ltd., Genitron EPB)

were mixed by tumble blending.

The mixture was processed as described in Example 1, except that barrel and die heating zones were set at 150°, 160°, 170°, 180° and 190° C. respectively, the die opening adjusted to 3.0 mm and the rolling bank of material in the die nip maintained at about 5 mm diameter by adjusting the speed of the nip rolls. The web obtained, which was about 1.4 mm thick, exhibited a variegated reflective appearance.

EXAMPLE 6

60 parts by weight Polystyrene granules (Sterling ST. 153 Natural).

10 parts by weight Nylon 11 granules (Aquitaine Total Organica S.A.., Rilsan BENO)

0.4 parts by weight blowing agent (Fisons Ltd., Genitron EPB)

were mixed by tumble blending.

The mixture was processed as described in Example 1, except that the barrel and die heating zones were set at 160°, 170°, 180°, 195° and 200° C. respectively, the die opening adjusted to 3.0 mm and the rolling bank of material maintained at about 5 mm diameter by adjusting the speed of the nip rolls. The sheet obtained was yellowish/white in colour and exhibited a variable pattern of light and dark areas.

EXAMPLE 7

50 parts by weight Polystyrene granules (Sterling ST.153 Natural)

10 parts by weight polystyrene granules containing blowing agent (Sterling ST.153/SF Natural)

10 parts High Density polyethylene granules (Wacker DF 5074G)

were mixed by tumble blending.

The mixture was processed as described in Example 5 to give a web about 1.1 mm thick which was white in colour and exhibited a pattern of light and dark shading.

The web was cut into sheets and employed as wall-cladding material.

EXAMPLE 8

50 parts by weight Polystyrene granules (Sterling ST. 153 Natural)

10 parts by weight polystyrene granules containing blowing agent (Sterling ST.153/SF Natural)

10 parts by weight polypropylene (I.C.I. "Propathene" GWE 21 Natural)
0.01 parts by weight yellow pigment (PV Fast Yellow)
0.01 parts by weight blue pigment (BV Fast Blue)

were mixed by tumble blending.

The mixture was processed as described in Example 5 to give a web about 1.1 mm thick was emerald green in colour and featured a pattern of fibrous reflective element against a darker background. The web was cut into sheets which were adhered to a chipboard substrate useful as a partitioning material.

EXAMPLE 9

50 parts by weight polystyrene granules (Sterling ST. 153 Natural)
10 parts by weight polystyrene granules containing blowing agent (Sterling ST. 153/SF Natural)
10 parts by weight polypropylene granules (I.C.I. "Propathene" GWE. 21 Natural).
0.15 parts by weight Black Masterbatch ("Propathene" C4/905 Ebony Black)
15 parts by weight fire retardant (DOW Chemicals Ltd, FR300 BA)
5 parts by weight Antimony Oxide
0.45 parts by weight light stabiliser (Ciba-Geigy Ltd. Tinuvin 327)
0.225 parts by weight antioxidant (Ciba-Geigy Ltd Irganox 1076)

were mixing by tumble blending. The mixture was processed as described in Example 5, except that the die was maintained at a temperature of 200° C.

The web obtained, which was about 1 mm thick, was patterned with a fibrous striation giving it the general appearance of wood. When subjected to the oxygen index test according to ASTM D 2863/70 a valve of 30.5 was obtained. This compared with the value of less than 26 obtained with a product prepared in the same manner but without the inclusion of FR 300 BA and Antimony Oxide. The web was cut into sheets each of which was adhered to a chipboard substrate and used to fabricate furniture.

EXAMPLES 10, 11 and 12

To exemplify the use of mixtures of crystalline polymers, the following blends were mixed by tumbling and then extruded as described in Example 9.

| EXAMPLE NO. | 10 | 11 | 12 |
|---|---|---|---|
| Polypropylene granules (I.C.I. "Propathene" GWE. 21) | 40 parts by weight | 10 parts by weight | 40 parts by weight |
| High density Polyethylene granules (Wacker-Chemie G.m.b.H DF 5074G) | 10 parts by weight | — | — |
| Nylon 11 granules (A.T.O. Rilsan BENO) | — | 40 parts by weight | 10 parts by weight |
| Genitron E.P.B. | 0.5 parts by weight | 0.5 parts by weight | 0.5 parts by weight |

The webs obtained were translucent and in the thickness range 0.6–0.9 mm. Each of the products from Examples 10, 11 and 12 exhibited a distinctive patterning comprising variegated striations, the nature of the pattern obtained being different for each of the products.

We claim:

1. A process for preparing thermoplastic sheets or webs, which process comprises the steps of:
   (i) extruding a foamable thermoplastic polymer mixture through the die of a screw extruder to produce a foamed extrudate in sheet or web form, the foamable thermoplastic polymer mixture containing at least a first and a second thermoplastic polymer, the first thermoplastic polymer being substantially crystalline and having a higher melting point than, and being substantially immiscible with, the second thermoplastic polymer, and the temperature of extrusion being equal to or greater than the melting point of the first thermoplastic polymer;
   (ii) stretching the foamed extrudate from step (i) in the direction of extrusion as it leaves the die to rupture most of the cells of the foamed extrudate and to elongate the walls of the collapsed cells in the direction of stretch;
   (iii) compressing the stretched extrudate from step (ii) while it remains plastic; and
   (iv) cooling and foamed, stretched and compressed extrudate from step (iii).

2. A process according to claim 1 wherein the die of the extruder is a sheet die fitted with a restrictor bar and adjustable die lips and the extrudate is stretched in step (ii) and compressed in step (iii) by passing it, whilst it remains plastic, through co-operating nip means comprising a pair of driven metal rollers mounted on horizontal axes and vertically disposed in relation to each other so as to define a gap parallel to the die slit and driven in contra-rotation.

3. A process according to claim 2 wherein the gap between the rollers and their speed of rotation is such as to maintain a surplus of the extrudate upon the sheet or web adjacent the nip.

4. A process according to claim 1 wherein sheets or webs are produced having a thickness of 0.4 mm to 1.0 mm.

5. A process according to claim 1 wherein at least one of the first and second thermoplastic polymers is introduced into the extruder in the form of beads or granules and at least some of the beads or granules contain a blowing agent.

6. A process according to claim 5 wherein the foamable thermoplastic polymer mixture has been formed by mixing beads or granules of the second thermoplastic polymer containing a colourant corresponding to the background colour desired in the product sheet or web with beads or granules of the first thermoplastic polymer containing a higher proportion of the same or a different colourant.

7. A process according to claim 1 wherein the second thermoplastic polymer is a non-crystalline thermoplastic polymer.

8. A process according to claim 7 wherein the first thermoplastic polymer is selected from high density polyethylene, polypropylene, polybutene-1, poly 4-methylpentene-1, polyethylene terephthalate, nylon 6, nylon 66 and nylon 11 and the second thermoplastic polymer is selected from cellulose acetate, cellulose propionate, cellulose acetate butyrate, ethyl cellulose, polystyrene, styrene-acrylonitrile copolymers, polycarbonates, styrene and methyl styrene copolymers and phenylene oxide polymers.

9. A process according to claim 8 wherein the foamable thermoplastic polymer mixture comprises 60 to 95 parts of polystyrene and 40 to 5 parts of polypropylene per 100 parts by weight of the thermoplastic polymer components of the foamable mixture.

10. A process according to claim 1 wherein the foamable thermoplastic polymer mixture contains up to 1% by weight of blowing agent.

11. A process according to claim 1 which includes the additional step of sanding one or both surfaces of the extrudate subsequent to the cooling step (iv).

12. A process according to claim 1 which includes the additional step of varnishing or staining the extrudate subsequent to the cooling step (iv).

13. The thermoplastic sheet or web having an integral patterning and fibrous structure prepared in accordance with the process of claim 1.

14. A surfacing structure comprising the sheet or web product of claim 13 bonded to a substrate by an adhesive.

* * * * *